United States Patent
Ray

(10) Patent No.: US 6,698,584 B1
(45) Date of Patent: Mar. 2, 2004

(54) CONVEYOR TRUSS BRACKET

(76) Inventor: Richard C. Ray, 9481 Singleton Rd., Midlothian, TX (US) 76065

( * ) Notice: Subject to any disclaimer, the term of this patent is extended or adjusted under 35 U.S.C. 154(b) by 0 days.

(21) Appl. No.: 10/328,897

(22) Filed: Dec. 23, 2002

Related U.S. Application Data

(60) Provisional application No. 60/433,629, filed on Dec. 13, 2002.

(51) Int. Cl.[7] .................. B65G 21/00; B65G 21/08; B65G 21/10; B65G 41/00
(52) U.S. Cl. ........................ 198/861.1; 198/860.2
(58) Field of Search ..................... 198/860.2, 861.1

(56) References Cited

U.S. PATENT DOCUMENTS

| | | | | |
|---|---|---|---|---|
| 3,656,607 A | * | 4/1972 | Gorgei et al. | 198/861.4 |
| 3,820,650 A | * | 6/1974 | Garvey | 198/861.1 |
| 4,261,460 A | * | 4/1981 | Peterson, II | 198/861.1 |
| 4,524,864 A | * | 6/1985 | Peterson, II | 198/861.1 |
| 5,762,179 A | * | 6/1998 | Oury et al. | 198/861.1 |

* cited by examiner

Primary Examiner—Gene O. Crawford
(74) Attorney, Agent, or Firm—Jackson Walker LLP; Robert C. Klinger

(57) ABSTRACT

An apparatus is provided for modifying a belt conveyor for enabling use of varying belt widths. The apparatus includes a pair of first mounting feet having slots and coupled by a cross member, wherein the first mounting feet are coupled to the cross member enabling the slots to mate with holes disposed on the frame, the apparatus further has second mounting feet having slots and adapted to couple to a first upper idler and a first lower idler, the apparatus further having supports coupled to opposite ends of the cross member, wherein a first end of the supports is coupled to the cross member and a second end is coupled to the second mounting feet. The apparatus is further characterized in that the cross member has a selectable length such that a second upper idler having a width greater than the first upper idler and a second lower idler having a width greater than the first lower idler can be coupled to the conveyor frame.

15 Claims, 3 Drawing Sheets

| PART NUMBER | FROM | TO | IDLER DIAMETER | A | B | C | OAL | WEIGHT (LBS) |
|---|---|---|---|---|---|---|---|---|
| RW 48 5 - 42 | 42" BELT | 48" BELT | 5" or 6" | 57 | 51 | 60 | 5' - 0 1/2" | 58.4 |
| RW 48 5 - 36 | 36" BELT | 48" BELT | 5" or 6" | 57 | 45 | 60 | 5' - 0 1/2" | 58.4 |
| RW 48 5 - 30 | 30" BELT | 48" BELT | 5" or 6" | 57 | 39 | 60 | 5' - 0 1/2" | 58.4 |
| RW 42 5 - 36 | 36" BELT | 42" BELT | 5" or 6" | 51 | 45 | 54 | 4' - 6 1/2" | 55 |
| RW 42 5 - 30 | 30" BELT | 42" BELT | 5" or 6" | 51 | 39 | 54 | 4' - 6 1/2" | 55 |
| RW 42 5 - 24 | 24" BELT | 42" BELT | 5" or 6" | 51 | 33 | 54 | 4' - 6 1/2" | 55 |
| RW 36 5 - 30 | 30" BELT | 36" BELT | 5" or 6" | 45 | 39 | 48 | 4' - 0 1/2" | 51.6 |
| RW 36 5 - 24 | 24" BELT | 36" BELT | 5" or 6" | 45 | 33 | 48 | 4' - 0 1/2" | 51.6 |
| RW 36 5 - 18 | 18" BELT | 36" BELT | 5" or 6" | 45 | 27 | 48 | 4' - 0 1/2" | 51.6 |
| RW 30 5 - 24 | 24" BELT | 30" BELT | 5" or 6" | 39 | 33 | 42 | 5' - 6 1/2" | 48.3 |
| RW 30 5 - 18 | 18" BELT | 30" BELT | 5" or 6" | 39 | 27 | 42 | 3' - 6 1/2" | 48.3 |
| RW 24 5 - 18 | 18" BELT | 24" BELT | 5" or 6" | 33 | 27 | 36 | 3' - 0 1/2" | 45 |

CONVEYOR TRUSS BRACKET

This application claims the priority under 35 U.S.C. 119(e)(1) of U.S. provisional application No. 60/433,629, filed on Dec. 13, 2002, titled CONVEYOR TRUSS BRACKET, and is incorporated herein by reference.

BACKGROUND OF THE INVENTION

1. Technical Field of the Invention

The present invention relates to bulk material handling systems including conveyor belts supported on belt conveyor idlers and, more specifically, to an apparatus and system for enabling use of larger conveyor idlers.

2. Description of Related Art

In the overland transportation of bulk materials it has been found that the use of long stretches of conveyor are a cost efficient and reliable method of transporting materials from place to place. It is typical to see conveyor belt systems conveying, for example, materials from sand or gravel pits to processing stations and materials from coal stock piles to generation stations. Rather than utilizing trucks, rail cars, or lifts these long runs of conveyor belts provide low cost operation as well as set-up and positioning flexibility. It is known to utilize a plurality of idler support frames to support and partially form a flexible conveyor belt into a moving trough upon which sand, gravel, coal, grain and other bulk materials can be transported.

A conventional belt conveyor includes the metal support structure typically designed for supporting specific size belt conveyor idlers or rollers. The idlers are spaced longitudinally along conveyor frames to provide the trough-shaped upper run, and a horizontal return run for the belt. Generally, the belt is driven by one or more power rollers typically located at an end of the conveyor frame. As should be understood, the amount of material that can be delivered is a function of the size of the belt.

To increase material transport capacity the belt size must be increased to meet increasing transport requirements. A larger belt size requires the use of larger idlers greater clearance. Unfortunately, typical conveyor systems are designed and built to use a single idler size and not adaptable to enable use of larger idlers when its capacity limit is reached.

One approach to increase capacity is to simply replace the existing conveyor with a larger conveyor. It should be understood, this approach would be, at a great expense. Another answer is to take the existing conveyor out of service for extensive re-fabrication of the conveyor system to enable use of larger idlers, and belts. This approach is also very expensive and very time consuming. Though this approach might be less expense than replacing the existing conveyor with a new larger conveyor, circumstances often do not allow such a time consuming approach. It would be advantageous to enable use of larger idlers and belts without expensive re-fabrication and long down times.

SUMMARY OF THE INVENTION

The present invention achieves technical advantages as an apparatus for modifying a belt conveyor for enabling use of varying belt widths. Typical belt conveyors have long frames, an endless belt and a plurality of idler portions arranged to be spaced apart one from another lengthwise of the frame and coupled via frame mounting holes. The idler portions include upper idlers i.e. troughing idlers over which the upper run of the belt passes and lower idlers i.e return idlers over which the lower run of the belt passes in which each of the idlers has a width approximately equal to a width of the belt used. Additionally, the lower run of the belt is lengthwise typically inside a portion of the elongated frame The modifying apparatus includes a pair of first mounting feet having slots and coupled by a cross member, wherein the first mounting feet are coupled to the cross member enabling the slots to mate with holes predisposed on the frame, the apparatus further has second mounting feet having slots adapted to couple to a first upper idler and a first lower idler. The apparatus further has supports coupled to opposite ends of the cross member, wherein a first end of the supports is coupled to the cross member and a second end is coupled to the second mounting feet. The apparatus is further characterized in that the cross member has an selectable length such that larger idlers having greater widths can be coupled to the conveyor frame.

BRIEF DESCRIPTION OF THE DRAWINGS

For a more complete understanding of the present invention, reference is made to the following detailed description taken in conjunction with the accompanying drawings. Throughout the drawings, it is noted that the same reference numerals or letters will be used to designate like or equivalent elements having the same function, wherein:

FIG. 5 illustrates an elevation view of the an idler and belt modifier shown in FIG. 3;

FIG. 6 illustrates an end view of the elevation view shown in FIG. 5;

DETAILED DESCRIPTION OF THE INVENTION

The numerous innovative teachings of the present application will be described with particular reference to the presently preferred exemplary embodiments. However, it should be understood that this class of embodiments provides only a few examples of the many advantageous uses and innovative teachings herein. In general, statements made in the specification of the present application do not necessarily delimit any of the various claimed inventions. Moreover, some statements may apply to some inventive features, but not to others.

Detailed descriptions of known functions and constructions unnecessarily obscuring the subject matter of the present invention have been omitted for clarity.

Figure 1:
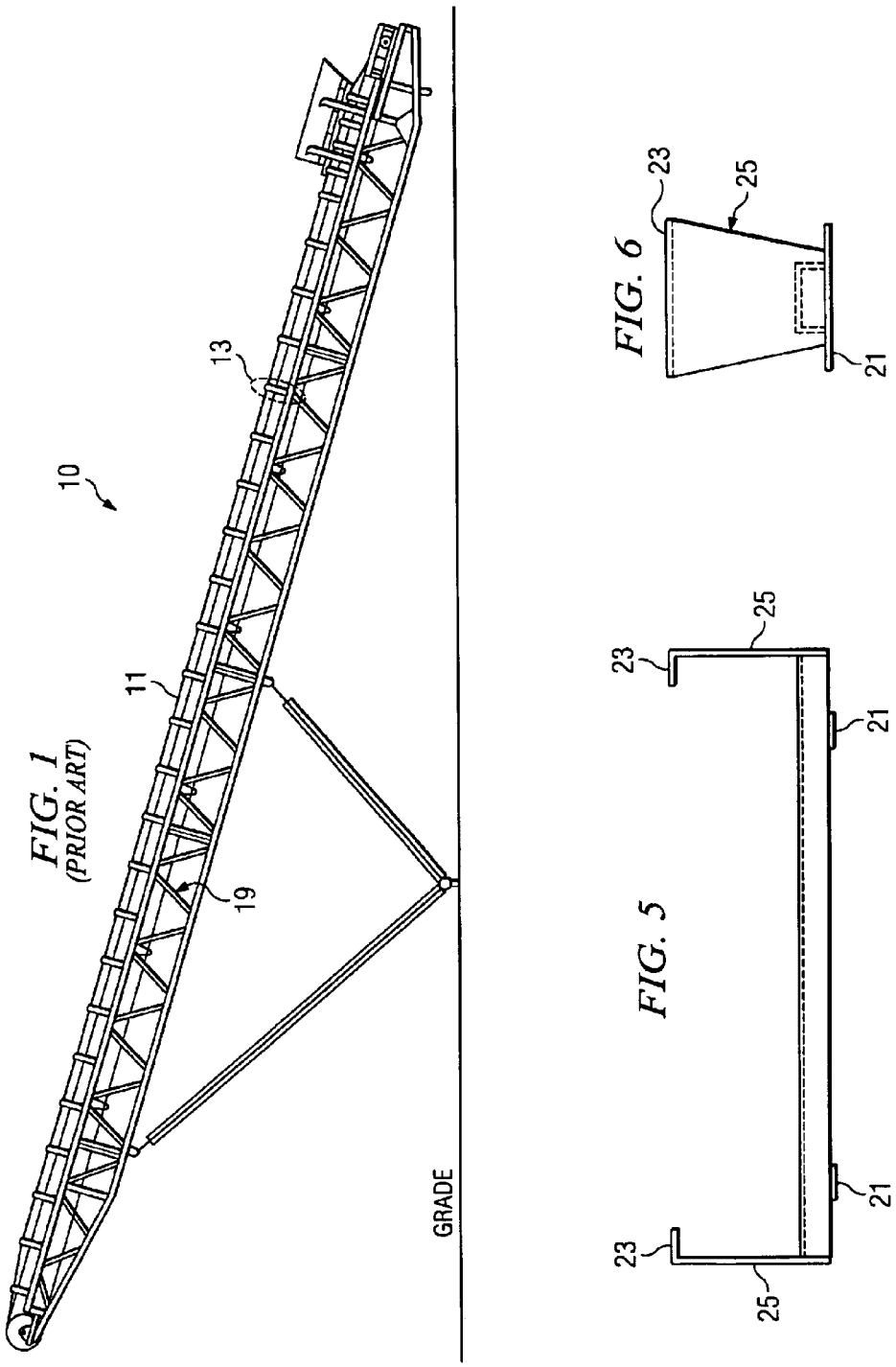
FIG. 1 illustrates a conventional belt conveyor system.

Referring now to FIG. 1 there is illustrated a conventional truss belt conveyor 10. The conveyor includes an elongated truss frame 19 that is generally fabricated from angle iron that may be of considerable length. The belt conveyor 10 also includes a plurality of idler or roller sections 13 over which the endless belt 11 rides.

Figure 2:
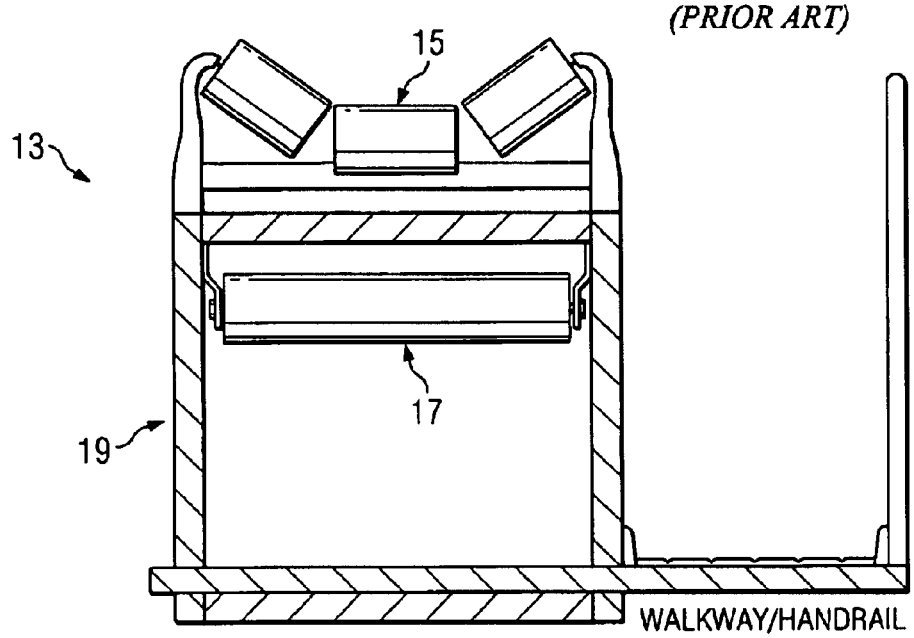
FIG. 2 illustrates an idler assembly portion of the belt conveyor system shown in FIG. 1.

FIG. 2 illustrates an idler section 13 of the belt conveyor 10 shown in FIG. 1 and includes an upper trough idler 15 and a lower flat return idler 17. The trough idler 15 is coupled to the top portion of the conveyor truss frame 19 and the flat idler is generally coupled to an inner portion of the conveyor truss frame 19 via mounting holes. A walkway/handrail may also be integrated into the truss frame 19.

The trough idlers 15 include outer rollers that are inclined at an angle and extend outwardly from a center roller. The flexible, endless conveyor belt 11 is trained around the upper trough idlers 15 and the lower flat idlers 17. The trough idler 15 and flat idler 17 also include conventional brackets for supporting the rollers and securing the idlers to the truss frame 19. As can be seen, the belt returns over the flat idlers 17 inside a portion of the truss frame 19. Thus, the belt width is limited by the inside width of the truss frame 19.

Figure 3:
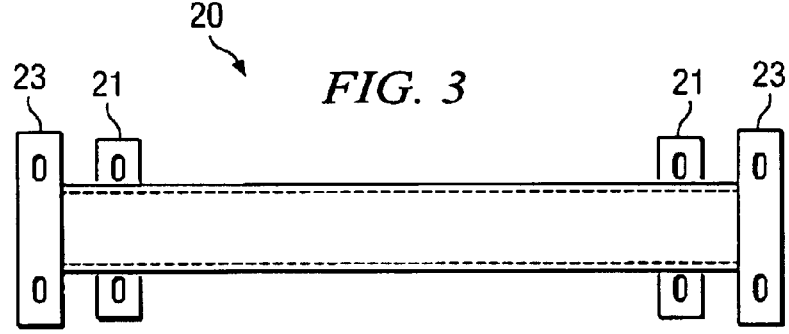
FIG. 3 illustrates a plan view of an idler and belt modifier in accordance with an exemplary embodiment of the present invention.

Referring now to FIGS. 3–6 and, more specifically, to FIG. 3 there is illustrated a plan view of an idler and belt modifier 20 in accordance with an exemplary embodiment of the present invention. The modifier 20 includes a pair of truss connector feet 21 coupled by a perpendicular cross member (shown by the dashed line). Each foot 21 has a pair of through slots adapted for a connecting device, such as a bolt, for attaching the modifier 20 to a conveyor truss frame 19. The feet 21 are fixedly attached to the cross member at a dimension such that the feet slots mate with the truss frame mounting holes of the original idlers 15, 17. Thus, the original smaller idlers 15, 17 can be removed and the modifier 20 can be installed with no modification to the original conveyor truss frame 19. In another embodiment, the feet 21 are adapted to be selectively mounted down the length of the cross member.

Figure 4:
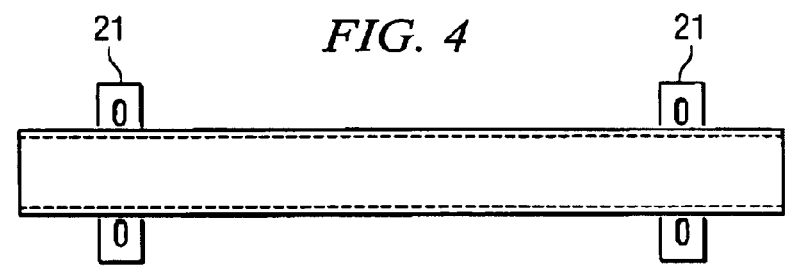
FIG. 4 illustrates a sectional view of the section marked A as shown in FIG. 5.

Referring now to FIG. 5 there is shown an elevation view of the an idler and belt modifier shown in plain view in FIG. 3. Additionally, FIG. 4 shows a sectional of view of the modifier at the section line A shown in FIG. 5. The modifier 20 further includes side support members 25 coupled in a perpendicular plane at opposite outermost ends of the cross member. In the example shown, the height of the side support members is approximately 10 inches, though other heights are contemplated. This distance is selected for an appropriate vertical clearance for the return idler which is coupled between truss connector feet 21 and the second mounting feet 23. This return idler space also has a horizontal width shown as "C". Width C is greater than the width of the inner portion of the conveyor truss frame 19. A greater return idler space width enables use of larger width belts. FIG. 6 illustrates an end view of the elevation view shown in FIG. 5 which better illustrates the side support member 25.

On the end of the side support member 25 opposite the cross member end are attached the second pair of mounting feet 23 in a plane parallel to the truss connector feet 21. As can be seen from dimensions A and B in FIG. 5, the second pair of mounting feet 23 are at a greater distance apart than the truss connector feet 21. This greater distance enables use of larger idlers and belts.

Figures 7, 8:
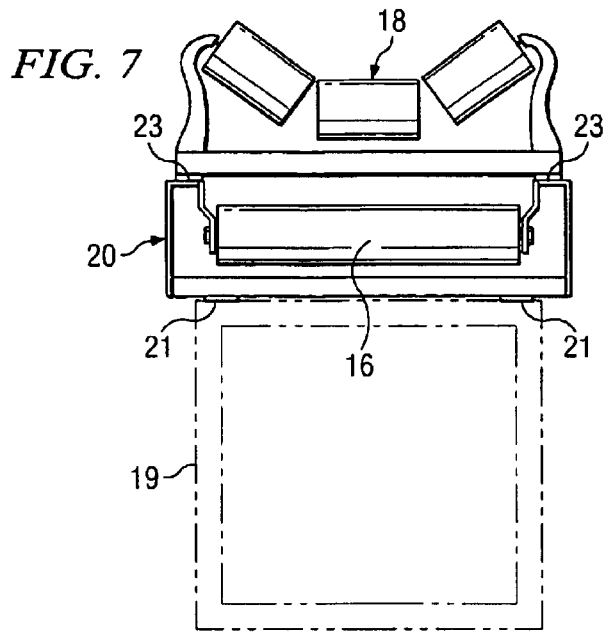
FIG. 7 illustrates an assembly of the an idler and belt modifier shown in FIGS. 3–6 in relation to the conveyor truss frame shown in FIG. 1.
FIG. 8 shows a table correlating dimensions of the an idler and belt modifier shown in FIGS. 3–6 with belt sizes.

Referring now to FIG. 7 there is illustrated an assembly of the an idler and belt modifier 20 in relation to a conveyor truss frame such as that shown in FIG. 1. The modifier 20 is an example of one of many sizes of modifiers that are contemplated for an existing conveyor frame. Other modifiers are shown in the table illustrated in FIG. 8. The table correlates dimensions of the idler and belt modifier (shown in FIGS. 3–6) with belt sizes. Further, the dimensions shown are advantageously selected such that standard trough and return idlers can be used.

The modifier 20 shown in FIG. 7 is listed as part number RW 245-18 in the table and is shown as item 81. Column 83 shows the original belt width dimensions for respective conveyor frames and column 85 shows the corresponding belts width dimensions that are enabled using the modifier. As can be seen for example, RW 24 5-18 enables a 24 inch belt to be used on a conveyor truss frame designed for an 18 inch belt and RW 36 5-18 enables a 36 inch belt.

Referring back to FIG. 7, the existing truss frame 19 (shown in dotted lines) is shown with the original idlers removed. The distance between the original mounting holes for this typical size conveyor truss frame 19 is approximately 2 feet and 5. The modifier truss connector feet 21 are coupled to the conveyor truss frame 19 via the original mounting holes. The second mounting feet 23 are used to couple the new larger trough idler 18 and return idler 16. Installation can be made with a minimum of downtime. In addition, existing accessories of the original conveyor, such as emergency lanyard, start/stop stations, conveyor covers, can be utilized. With the modifier 20, the horizontal width of the return idler space has increased enabling the clearance required when using larger belt widths. For the modifier (part number RW 24 5-18) shown here, the horizontal width of the return idler space has been increased from less than 2 feet and 5 inches (i.e., the approximate dimension of the inner width of the conveyor truss frame 19) to approximately 3 feet.

Although a preferred embodiment of the apparatus and system of the present invention has been illustrated in the accompanied drawings and described in the foregoing Detailed Description, it is understood that the invention is not limited to the embodiments disclosed, but is capable of numerous rearrangements, modifications, and substitutions without departing from the spirit of the invention as set forth and defined by the following claims.

The aforementioned embodiment depicts a truss frame conveyor system. The invention may also be used on a conventional channel frame or other conveyor frames.

What is claimed is:

1. An apparatus for modifying a belt conveyor which has an elongated frame, an endless belt and a plurality of idler portions arranged to be spaced apart one from another lengthwise of the frame and coupled via frame mounting holes, each idler portion including a first upper idler over which the upper run of the belt passes and a first lower idler over which the lower run of the belt passes, each of the idlers having a width approximately equal to a width of the belt, wherein the lower run of the belt is lengthwise inside a portion of the elongated frame, the apparatus comprising:

a pair of first mounting feet having slots and coupled by a cross member, wherein said first mounting feet are coupled to said cross member enabling the slots to mate with the frame mounting holes;

second mounting feet having slots and adapted to couple to a second upper idler and a second lower idler, said second upper idler having a width greater than said first upper idler and said second lower idler having a width greater than said first lower idler;

supports coupled to opposite ends of said cross member, wherein a first end of said supports is coupled to said cross member and a second end is coupled to said second mounting feet; and wherein said cross member has a length greater than the width of said second lower idler.

2. The apparatus of claim 1, wherein said second upper idler is a trough idler.

3. The apparatus of claim 1 having an overall length greater than a width of the conveyor frame.

4. The apparatus of claim 1, wherein said first mounting feet are selectable down the length of said cross member.

5. The apparatus of claim 1, wherein said second upper idler and said second lower idler include brackets adapted for coupling via said second mounting feet slots.

6. The apparatus of claim 1 further characterized in that said second upper idler and said second lower idler enable use of a belt having a width greater than the inside portion of the conveyor frame allows.

7. The apparatus of claim 1, wherein the lower run of the belt is redirected outside the conveyor frame.

8. The apparatus of claim 7 wherein said cross member and said supports are cooperable to define an area providing clearance for said second lower idler.

9. A belt conveyor selectable for enabling use of varying belt widths, comprising:

an elongated frame and a plurality of idler portions arranged to be spaced apart one from another lengthwise of the frame;

each of said idler portion including:
a first upper idler over which the upper run of the belt passes;
a first lower idler over which the lower run of the belt passes, each of the idlers having a width approximately equal to a width of the belt; and
a modifier having a pair of first mounting feet having slots and coupled by a cross member, wherein said first mounting feet are coupled to said cross member enabling the slots to mate with holes disposed on said frame, said modifier further having second mounting feet having slots and adapted to couple to said first upper idler and said first lower idler, said modifier further having supports coupled to opposite ends of said cross member, wherein a first end of said supports is coupled to said cross member and a second end is coupled to said second mounting feet; and said modifier further characterized in that said cross member has a selectable length such that a second upper idler having a width greater than said first upper idler and a second lower idler having a width greater than said first lower idler can be coupled to said frame.

10. The belt conveyor of claim 9, wherein the lower run of the belt is outside the conveyor frame.

11. The belt conveyor of claim 9, wherein said cross member and said supports are cooperable to define an area providing clearance for said lower idlers.

12. The belt conveyor of claim 9, wherein said upper idlers are trough idlers.

13. The belt conveyor of claim 9, wherein said modifier has an overall length greater than a width of the conveyor frame.

14. The belt conveyor of claim 9, wherein said first mounting feet are selectable down the length of said cross member.

15. The belt conveyor of claim 9 further characterized in that said second upper idler and said second lower idler enable use of a belt having a width greater than the inside portion of the conveyor frame allows.

* * * * *